United States Patent
Watson et al.

(10) Patent No.: US 10,986,087 B2
(45) Date of Patent: Apr. 20, 2021

(54) MOTION BASED AUTHENTICATION

(71) Applicant: International Business Machines Corporation, Armonk, NY (US)

(72) Inventors: Patrick Watson, Montrose, NY (US); Tengfei Ma, White Plains, NY (US); Maria Chang, Irvington, NY (US); Jae-Wook Ahn, Nanuet, NY (US); Ravi Tejwani, White Plains, NY (US); Aldis Sipolins, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/037,542

(22) Filed: Jul. 17, 2018

(65) Prior Publication Data

US 2020/0028843 A1 Jan. 23, 2020

(51) Int. Cl.
*H04L 29/06* (2006.01)
*G06F 3/01* (2006.01)

(52) U.S. Cl.
CPC .......... *H04L 63/0861* (2013.01); *G06F 3/017* (2013.01)

(58) Field of Classification Search
CPC ............................ H04L 63/0861; G06F 3/017
See application file for complete search history.

(56) References Cited

U.S. PATENT DOCUMENTS

| | | | |
|---|---|---|---|
| 6,421,453 B1* | 7/2002 | Kanevsky | G06F 21/316 382/115 |
| 6,721,738 B2 | 4/2004 | Verplaetse et al. | |
| 8,332,932 B2 | 12/2012 | Kellas-Dicks et al. | |
| 8,539,550 B1 | 9/2013 | Terres et al. | |
| 8,963,806 B1* | 2/2015 | Starner | G06F 21/32 345/8 |
| 9,202,105 B1* | 12/2015 | Wang | G06F 21/32 |
| 9,355,236 B1* | 5/2016 | Kratz | G06F 21/31 |
| 9,679,197 B1* | 6/2017 | Sills | G06K 9/00355 |
| 10,855,473 B1* | 12/2020 | Griffin | H04L 9/3247 |

(Continued)

FOREIGN PATENT DOCUMENTS

| WO | WO-2014111947 A1 * | 7/2014 | ............ G06F 3/017 |
|---|---|---|---|
| WO | WO2018071826 A1 | 4/2018 | |

OTHER PUBLICATIONS

Amir et al., "A Low Power, Fully Event-Based Gesture Recognition System," IEEE Conference on Computer Vision and Pattern Recognition (CVPR), Honolulu, HI, Jul. 2017, pp. 7243-7252.

*Primary Examiner* — Vance M Little
(74) *Attorney, Agent, or Firm* — Yee & Associates, P.C.

(57) ABSTRACT

A method for authenticating a user is presented. Responsive to a request for access to a computer resource, a computer system prompts the user making the request to access the computer resource to perform a new motion in an environment in which the user is monitored by a sensor system. Detected biometric data in the new motion performed by the user is identified by the computer system. A determination is made as to whether the user performing the new motion is an authenticated user based on comparing the detected biometric data with stored biometric data for a prior motion performed by the authenticated user. The computer system provides access to the computer resource when the user is identified as the authenticated user.

18 Claims, 9 Drawing Sheets

(56) References Cited

U.S. PATENT DOCUMENTS

| | | | |
|---|---|---|---|
| 2008/0170776 A1* | 7/2008 | Albertson | G06F 21/36 382/154 |
| 2010/0162386 A1* | 6/2010 | Li | G06F 21/32 726/19 |
| 2011/0151974 A1* | 6/2011 | Deaguero | A63F 13/44 463/37 |
| 2012/0084734 A1* | 4/2012 | Wilairat | G06F 21/629 715/863 |
| 2013/0007614 A1* | 1/2013 | Bell | G06F 3/017 715/709 |
| 2013/0111580 A1* | 5/2013 | Checco | G06F 21/32 726/19 |
| 2013/0133048 A1* | 5/2013 | Wyn-Harris | H04L 63/08 726/5 |
| 2014/0125574 A1 | 5/2014 | Scavezze et al. | |
| 2014/0333524 A1* | 11/2014 | Liu | H04L 63/0861 345/156 |
| 2014/0347479 A1* | 11/2014 | Givon | H04N 21/4415 348/143 |
| 2015/0213244 A1* | 7/2015 | Lymberopoulos | G06F 21/45 726/18 |
| 2016/0063230 A1* | 3/2016 | Alten | G06F 21/316 726/28 |
| 2016/0109954 A1* | 4/2016 | Harris | G06F 3/017 345/156 |
| 2016/0162673 A1* | 6/2016 | Kutliroff | G06F 21/32 382/115 |
| 2016/0188861 A1 | 6/2016 | Todeschini | |
| 2016/0291697 A1* | 10/2016 | Jules | G06F 3/041 |
| 2017/0171218 A1* | 6/2017 | Shippy | H04W 12/06 |
| 2020/0201443 A1* | 6/2020 | Huang | G06N 3/08 |

* cited by examiner

MOTION BASED AUTHENTICATION

BACKGROUND

1. Field

The disclosure relates generally to an improved computer system and, more specifically, to a method, an apparatus, a system, and a computer program product for authenticating a user in a reality system.

2. Description of the Related Art

Augmented reality environments and virtual reality environments are environments that a human user can view and interact with. An augmented reality environment is a real-world environment that is augmented with computer generated information. The computer-generated information can include visual, auditory, haptic, or other information that can be added to a perception of the real-world environment.

A virtual reality environment is a simulated environment generated by a computer system. This type of environment can include visual, auditory, haptic, and other types of information that is perceived by a user. The virtual reality environment can simulate a real-world environment, an artificial environment, an imaginary environment, or some combination thereof. A user can view, move within, and interact with the virtual reality environment.

A user may wish to access computer resources while immersed in one of these environments. For example, the user may want to access settings, a save session, a video, or other computer resources. Accessing computer resources information in these types of environments can be controlled by authentication of the user. User authentication is difficult in a virtual reality and augmented reality environment. These types of environments are not meant to be used with a mouse and a keyboard. Users are unable to type on a keyboard when wearing a headset in a virtual reality environment or do not typically have access to a keyboard in a virtual reality or augmented reality environment.

Therefore, it would be desirable to have a method and an apparatus that take into account at least some of the issues discussed above, as well as other possible issues. For example, it would be desirable to have a method and an apparatus that overcome a technical problem with authenticating a user to access computer resources in a virtual reality or an augmented reality environment.

SUMMARY

According to one embodiment of the present invention, a method for authenticating a user is present. Responsive to a request for access to a computer resource, a computer system prompts the user making the request to access the computer resource to perform a new motion in an environment in which the user is monitored by a sensor system. The computer system identifies detected biometric data in the new motion performed by the user. A determination is made, by the computer system, as to whether the user performing the new motion is an authenticated user based on comparing the detected biometric data with stored biometric data for a prior motion performed by the authenticated user. The computer system provides access to the computer resource when the user is identified as the authenticated user.

According to another embodiment of the present invention, an authentication system comprises a computer system and a motion analyzer running on the computer system. The motion analyzer prompts a user making a request to access a computer resource to perform a new motion in an environment in which the user is monitored by a sensor system in response to the request for access to the computer resource.

The motion analyzer then identifies detected biometric data in the new motion performed by the user. A determination is made by the motion analyzer as to whether the user performing the new motion is an authenticated user based on comparing the detected biometric data with stored biometric data for a prior motion performed by the authenticated user. The motion analyzer then provides access to the computer resource when the user is identified as the authenticated user.

According to yet another embodiment of the present invention, a computer program product for authenticating a user comprises a computer-readable-storage media, first program code, second program code, third program code, and fourth program code stored on the computer-readable storage media. Responsive to a request for access to a computer resource, the first program code prompts the user making the request to access the computer resource to perform a new motion in an environment in which the user is monitored by a sensor system. The second program code identifies detected biometric data in the new motion performed by the user. The third program code determines whether the user performing the new motion is an authenticated user based on comparing the detected biometric data with stored biometric data for a prior motion performed by the authenticated user. The fourth program code provides the access to the computer resource when the user is identified as the authenticated user.

DETAILED DESCRIPTION

Figure 1:
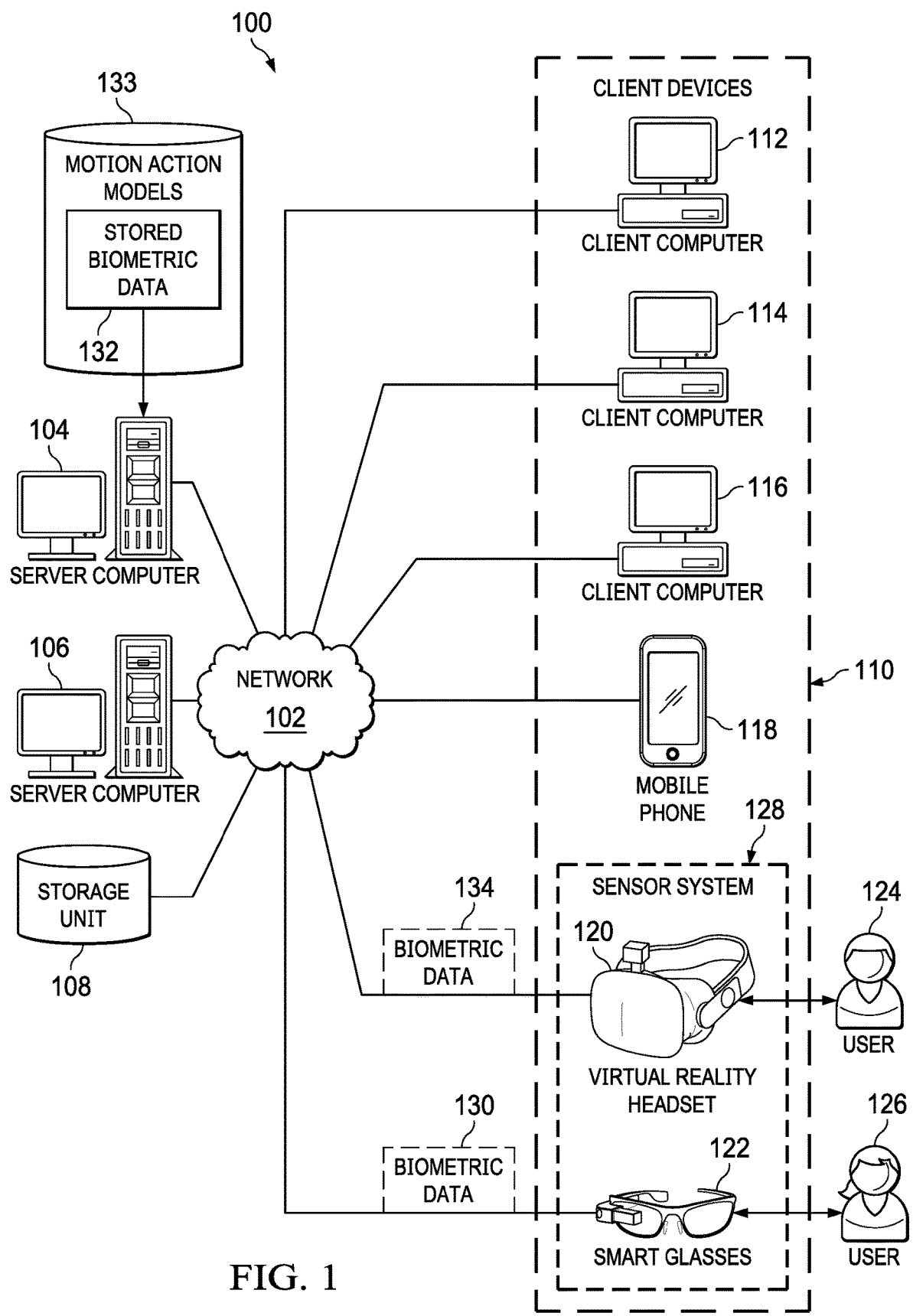
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take a number of different considerations. For example, the illustrative embodiments recognize and take into account that one solution to the current issue with authenticating a user in a virtual reality or an augmented reality environment involves using voice or gestures to authenticate the user. The illustrative embodiments, however, recognize and take into account that current techniques for this type of authentication are error-prone.

The illustrative embodiments also recognize and take into account that even if a keyboard is accessible, the traditional password-based user authentication has numerous problems. For example, the illustrative embodiments recognize and take into account that users forget passwords, often use easy-to-guess passwords, and changing passwords every few weeks wastes time.

Thus, the illustrative embodiments utilize motions performed by users to authenticate the users. For example, the users can be prompted to perform specific motions. For example, a user may be directed to move into a pose to form a teapot, catch a virtual ball, eat a virtual taco, or perform other motions for user authentication. A sensor system detects the motions and identifies biometric data. This biometric data may include, for example, movement of different parts of the user, position of various parts of the user, and the speed, precision, and variability in the motions. This biometric data can be stored and compared with a later performance of the same motions to authenticate the user.

The illustrative embodiments provide a method, an apparatus, a system, and a computer program product for authenticating a user. In one illustrative example, a method is employed for authenticating a user. Responsive to a request for access to a computer resource, a computer system prompts the user making the request to access the computer resource to perform a new motion in an environment in which the user is monitored by a sensor system. The computer system identifies detected biometric data in the new motion performed by the user. A determination is made by the computer system as to whether the user performing the new motion is an authenticated user based on comparing the detected biometric data with stored biometric data for a prior motion performed by the authenticated user. The computer system provides access to the computer resource when the user is identified as the authenticated user.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, virtual reality (VR) headset 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IOT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer-recordable storage medium and downloaded to a data processing system or other device for use. For example, program code may be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one" of means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, user 124 wears virtual reality headset 120 and accesses a virtual reality environment provided by server computer 104. User 126 wears smart glasses 122 and accesses an augmented reality environment using server computer 106. In these illustrative examples, access to a computer resource is requested by user 124. The access can be provided by authenticating user 124. In this example, the authentication occurs when user 124 is performing a motion while being monitored by sensor system 128. User 124 may be prompted to perform a particular motion or may be expected to know what motion is to be performed without being given the prompt specifying the motion.

In this illustrative example, sensor system 128 comprises sensors in virtual reality headset 120. Biometric data 134 identified from user 124 performing a motion is sent to server computer 104. Server computer 104 compares biometric data 134 to stored biometric data 132 in motion action models 133. If a sufficient match is present between biometric data 130 and stored biometric data 132 for the motion performed by user 124, user 124 is authenticated and provided access to the requested computer resource.

Motion action models 133 are models of prior motions made for purposes of comparison to determine if users requesting access to computer resources are authenticated users for which access should be provided. These models include stored biometric data 132. These models also identify acceptable variations from motions described in stored biometric data 132. These motions, if made by one or more parts of a user, are also referred to as gestures. In this example, the prior motion comprises a set of gestures, wherein stored biometric data 132 comprises movement data identified for each of the set of gestures.

In this illustrative example, stored biometric data 132 is biometric data generated from a prior motion performed by user 124. Stored biometric data 132 may include data for other motions performed by user 124 or by other users such as user 126.

As another example, user 126 may request access to a computer resource. In a similar fashion, user 126 performs a motion in which biometric data 130 is generated by sensor system 128 from the motion performed by user 126. In this illustrative example, sensor system 128 includes sensors in smart glasses 122. If biometric data 130 is sufficiently close to stored biometric data 132 for the motion performed by user 126, access to the computer resource is provided.

The illustration of the depicted examples in FIG. 1 are not meant to limit the manner in which other illustrative examples can be implemented. For example, sensor system 128 can include sensors that are external to virtual reality headset 120 and smart glasses 122. For example, controllers, cameras, or other motion sensors may be located in proximity to user 124 and user 126. These devices can be considered sensors in sensor system 128.

As another example, sensors in smart glasses 122 worn by user 126 can be used to detect motion of user 124 and generate biometric data 130. In this illustrative example, smart glasses 122 sends biometric data 130 to server computer 104 in place of virtual reality headset 120 as depicted in FIG. 1.

Figure 2:
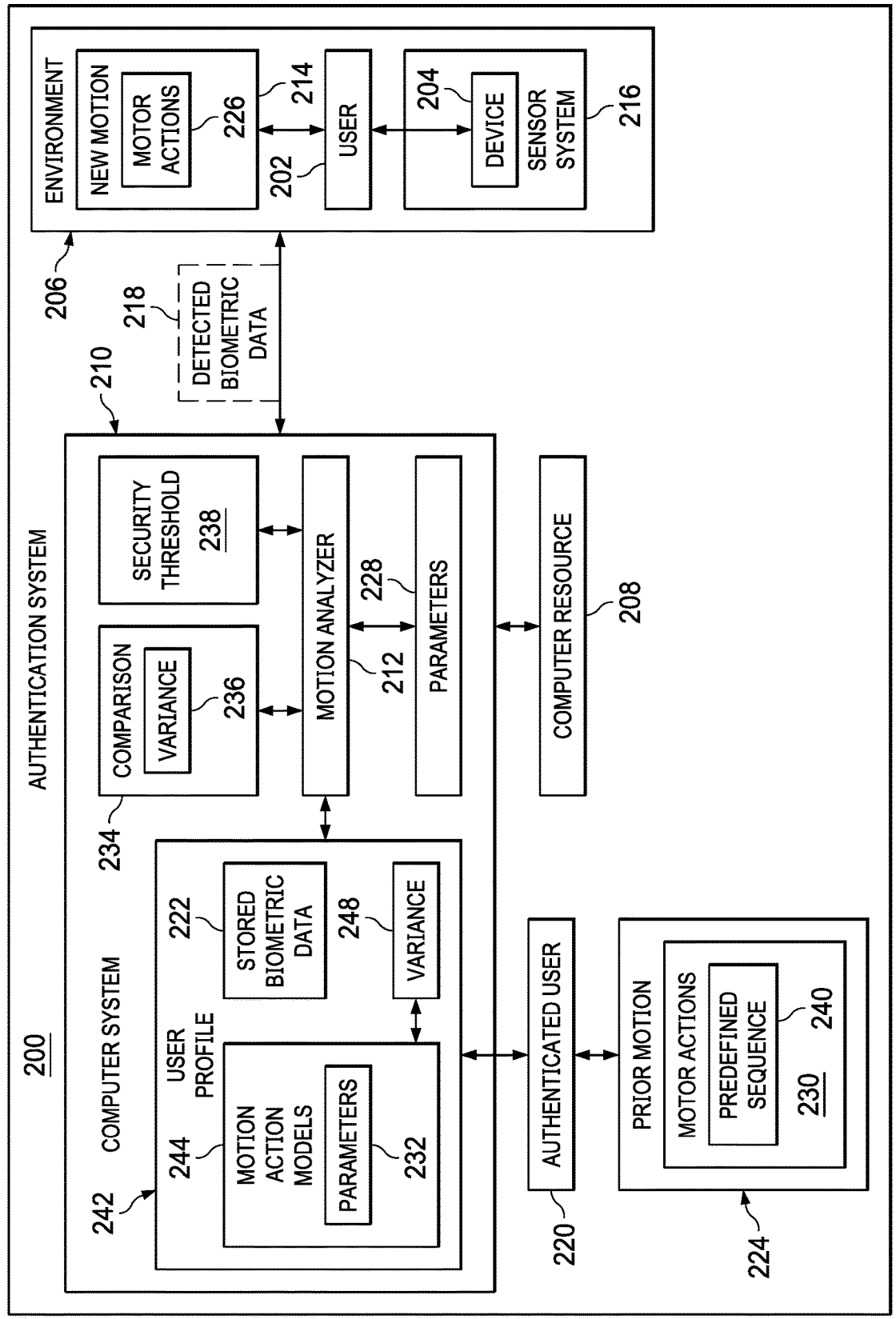
FIG. 2 is a block diagram of an authentication system in which is performed authentication using motion in accordance with an illustrative embodiment.

With reference now to FIG. 2, a block diagram of an authentication system in which authentication is performed using motion is depicted in accordance with an illustrative embodiment. In this illustrative example, authentication system 200 includes components that can be implemented in hardware such as the hardware shown in network data processing system 100 in FIG. 1.

In this illustrative example, user 202 operates device 204, which is designed to operate with environment 206. As depicted, environment 206 can take a number of different forms. For example, environment 206 can be selected from a group comprising a virtual reality environment, an augmented reality environment, a mixed reality environment, or other suitable types of environments. Device 204 is a hardware device that is used to enable user 202 to interact with environment 206.

For example, device 204 can be a virtual reality headset, smart glasses, a head-mounted device, a mobile phone, or some other suitable device that provides user 202 an ability to view and interact with environment 206. When specialized devices such as a virtual reality headset or smart glasses are used, user 202 can be immersed within environment 206.

In this illustrative example, user 202 requests access to computer resource 208. Computer resource 208 can take a number of different forms. For example, computer resource 208 can be selected from at least one of a webpage, a website, a spreadsheet, a saved game, a computer-aided design file, a drive, a program, a communications adapter, a computer, a camera, a microphone, personally identifiable information, settings, a configuration file, or other types of computer resources.

In this illustrative example, computer system 210 determines whether to provide user 202 with access to computer resource 208. As depicted, motion analyzer 212 runs on computer system 210 and includes processes to perform authentication of user 202.

Computer system 210 is a physical hardware system and includes one or more data processing systems. When more than one data processing system is present in computer system 210, those data processing systems are in communication with each other using a communications medium. The communications medium may be a network. The data processing systems may be selected from at least one of a computer, a server computer, a tablet, or some other suitable data processing system.

As depicted, motion analyzer 212 prompts user 202, making a request to access computer resource 208, to perform new motion 214 in environment 206 in which user 202 is monitored by sensor system 216 in response to the request for access to computer resource 208. Sensor system 216 comprises one or more sensors that detect or sense at least one of a movement or a position of a person or a part of a person. In this illustrative example, sensor system 216 comprises at least one of an accelerometer, a magnetometer, a gyroscope, a camera, an optical-tracking sensor, an eye-tracking sensor, a motion sensor, a force sensor, or some other suitable type of sensor. Additionally, sensor system 216 can include device 204. For example, sensors such as accelerometers, gyroscopes, cameras, or other sensors in device 204 can be part of sensor system 216 used detect new motion 214.

The prompting of user 202 can be performed in a number of different ways. For example, user 202 can be prompted to perform a specific motion. In another illustrative example, the prompt may be for user 202 to perform a motion without identifying the motion to be performed.

In this illustrative example, motion analyzer 212 identifies detected biometric data 218 in new motion 214 performed by user 202. Motion analyzer 212 determines whether user 202 performing new motion 214 is authenticated user 220 based on comparing detected biometric data 218 with stored biometric data 222 for prior motion 224 performed by authenticated user 220. In this illustrative example, motion analyzer 212 can employ computer vision, image processing, gesture recognition, or other processes processing detected biometric data 218. Motion analyzer 212 provides access to computer resource 208 when user 202 is identified as authenticated user 220 from the comparison.

In this example, stored biometric data 222 is stored in user profile 242 for authenticated user 220. As depicted, user profile 242 also includes motion action models 244. Motion action models 244 are models that describe motor actions 230 for prior motion 224 using stored biometric data 222. Motion action models 244 can be models for movement of at least one of a finger, an arm, a head, a hand, a leg, a foot, an eye, a jaw, or some other part of a person.

Motion action models 244 include a set of parameters 232 including values from stored biometric data 222 to describe motor actions 230. The values of the set of parameters 232 are based on stored biometric data 222. For example, the set of parameters 232 in each motion action model can include at least one of speed, acceleration, a start position, an ending position, time, or other parameters that can be identified using stored biometric data 222. Values for the set of parameters 232 can be obtained directly from values in stored biometric data 222 or derived from stored biometric data 222.

In this illustrative example, parameters 228 can be identified from detected biometric data 218 for motor actions 226 in new motion 214. The values of parameters 228 are compared to parameters 232 for prior motion 224 in determining whether user 202 is authenticated user 220.

Motion action models 244 can also include variance 236. Variance 236 can define how much difference from values for parameters 228 for motor actions 226 can be present and still be considered a movement that matches the motion action described by the corresponding motion action model in motion action models 244.

Variance 236 can be defined for each of motion action models 244 such that the amount of variance 236 can be different for different motion action models in motion action models 244. For example, variance 236 can define how variation in a position of a hand from the position of the hand in stored biometric data 222 can be considered a match to motion action model for a motor action involving movement of a hand.

In the illustrative example, new motion 214 is comprised of a set of motor actions 226. As used herein, "a set of," when used with reference to an item, means one or more items. For example, "a set of motor actions 226" is one more of motor actions 226.

Each motor action in motor actions 226 has a set of parameters 228 in detected biometric data 218. The set of parameters 228 in detected biometric data 218 includes at least one of position, rotation, speed, acceleration, or other parameters that describe a motor action.

As depicted, prior motion 224 is comprised of a set of motor actions 230 in stored biometric data 222. Each motor action in motor actions 230 has a set of parameters 232 in stored biometric data 222. Motor actions 230 for prior motion 224 have predefined sequence 240.

In this illustrative example, the comparison of new motion 214 to prior motion 224 can be made by comparing the set of motor actions 226 in new motion 214 corresponding to the set of motor actions 230 in prior motion 224 to form comparison 234. Part of the comparison of new motion 214 to prior motion 224 includes determining whether a sequence of motor actions 226 for new motion 214 matches predefined sequence 240 of motor actions 230 for prior motion 224.

As depicted, comparison 234 identifies variance 236 between new motion 214 and prior motion 224. Variance 236 is present between each of the set of motor actions 226 in new motion 214 and the set of motor actions 230 in prior motion 224. Whether new motion 214 sufficiently matches prior motion 224 can be determined based on variance 236.

The amount of variance 236 that can be present for a sufficient match is determined using security threshold 238 in this illustrative example. As the value of security threshold 238 increases, the amount of allowable variance increases. The amount of variance 236 can be selected for each motor action. In other words, different motor actions can have different amounts of variance specified by security threshold 238.

As depicted, security threshold 238 can be selected based on the type of computer resource 208 for which access is requested. For example, more sensitive or confidential computer resources can have a lower security threshold as compared to sensitive or confidential computer resources. For example, a saved game can have a higher security threshold as compared to personally identifiable information. With security threshold 238, motion analyzer 212 can determine whether user 202 performing new motion 214 is authenticated user 220 based on whether comparison 234 is within security threshold 238.

In another illustrative example, motion analyzer 212 can select new motion 214 based on a type of computer resource 208 requested by user 202. For example, a more complex and difficult motion can be selected when the type of resource is sensitive or confidential. For example, access to a configuration file can have a more difficult motion than access to viewing a webpage.

Motion analyzer 212 may be implemented in software, hardware, firmware, or a combination thereof. When software is used, the operations performed by motion analyzer 212 may be implemented in program code configured to run on hardware, such as a processor unit. When firmware is used, the operations performed by motion analyzer 212 may be implemented in program code and data and stored in persistent memory to run on a processor unit. When hardware is employed, the hardware may include circuits that operate to perform the operations in motion analyzer 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with authenticating a user to access computer resources in a virtual reality or an augmented reality environment. For example, one or more technical solutions employs motion analyzer 212 to enable a user to perform authentication to access a computer resource without using a keyboard or mouse. Instead, the user performs a motion that is compared to a user profile for an authenticated user. The user profile includes stored biometric data from the authenticated user performing a motion at a prior time before a request is made for a computer resource. The biometric data detected by the user is compared to the stored biometric data. This comparison can be performed by comparing the detected biometric data with parameters in motion action models based on the stored biometric data. As a result, one or more technical solutions may provide a technical effect of enabling a user to identify itself as an authenticated user to access a computer resource by performing a motion.

As a result, computer system 210 operates as a special purpose computer system in which motion analyzer 212 in computer system 210 enables determining whether a user is an authenticated user through analyzing motions performed by the user. In particular, motion analyzer 212 transforms computer system 210 into a special purpose computer system as compared to currently available general computer systems that do not have motion analyzer 212.

Figure 3:
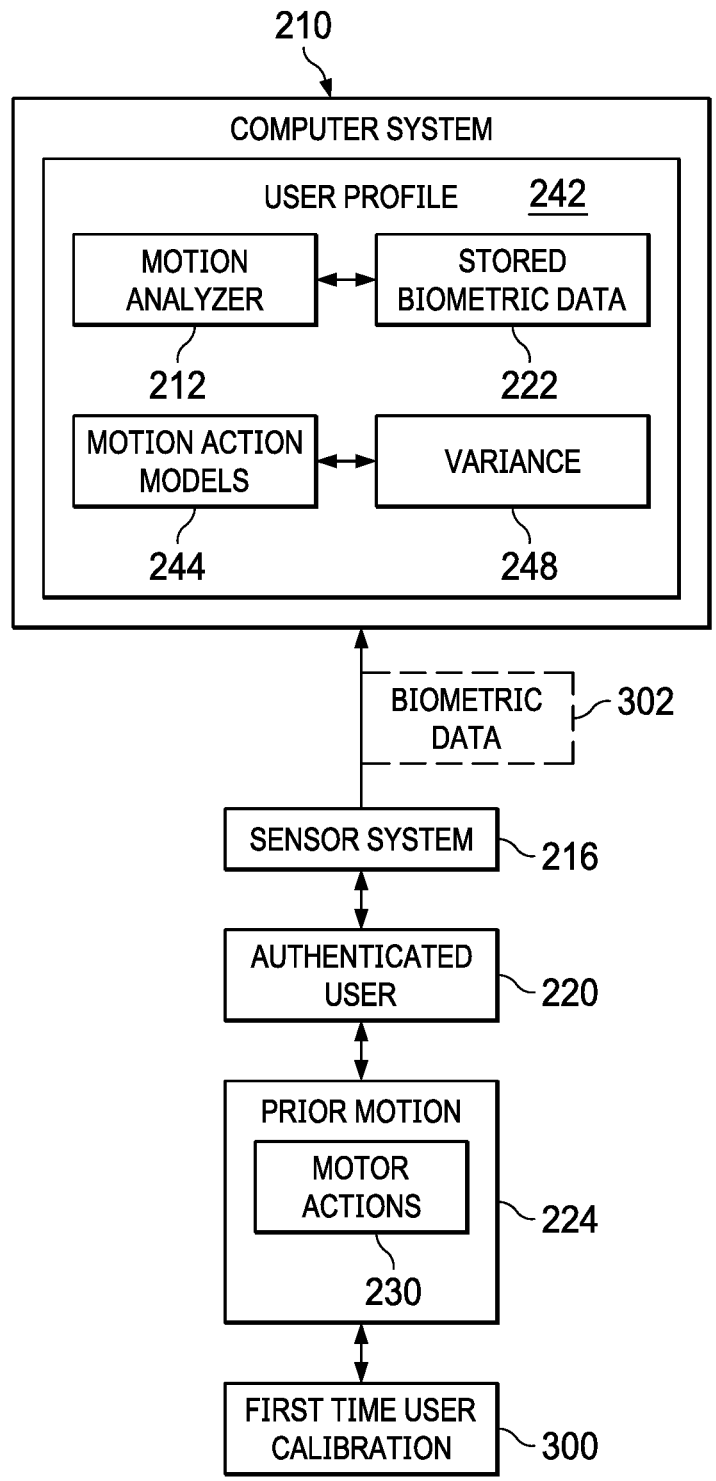
FIG. 3 is an illustration of generating biometric data for use in authenticating a user in accordance with an illustrative embodiment.

With reference next to FIG. 3, an illustration of generating biometric data for use in authenticating a user is depicted in accordance with an illustrative embodiment. In the illustrative examples, the same reference numeral may be used in more than one figure. This reuse of a reference numeral in different figures represents the same element in the different figures.

As depicted, motion analyzer 212 in computer system 210 prompts authenticated user 220 to perform prior motion 224. Prior motion 224 can be selected by motion analyzer 212 or authenticated user 220 depending on the particular implementation. The performance of prior motion 224 is at a time prior to user 202 requesting access to computer resource 208. The performance of prior motion 224 is first time user calibration 300.

Prior motion 224 take a number of different forms. For example, prior motion 224 can be selected from at least one of playing an air guitar, making a high five, becoming a teapot, catching a virtual ball, kicking a virtual ball, eating a virtual taco, follow a virtual moving object, or forming some other motion.

Motion analyzer 212 identifies motor actions 230 from the performance of prior motion 224 by authenticated user 220. In this illustrative example, prior motion 224 can be, for example, playing an air guitar. Motor actions 230 for playing air guitar can include movement of a left arm, movement of a right arm, position of a head, strumming of strings by a right hand, position of a left hand on a guitar neck, and other types of motor actions.

In this illustrative example, motion analyzer 212 can include communicating with an artificial intelligence system to identify motor actions 230. An artificial intelligence system is a system that is based on function of a human brain. An artificial intelligence system comprises at least one of an artificial neural network, a cognitive system, a Bayesian network, a fuzzy logic, an expert system, a natural language system, a cognitive system, or some other suitable system.

In this illustrative, prior motion 224 is defined by authenticated user 220. For example, authenticated user 220 can define how many motor actions are present in motor actions 230. Further, authenticated user 220 can also select the type of motion such as playing the air guitar. In other examples, authenticated user 220 can select a different type of motion such as kicking a ball or spreading peanut butter on a piece of toast.

As depicted, motion analyzer 212 receives biometric data 302 detected by sensor system 216 from authenticated user 220 performing prior motion 224. Biometric data 302 is stored or saved to form stored biometric data 222.

For each of these motor actions, motion analyzer 212 identifies parameters 232 from stored biometric data 222. The values of these parameters can be values in stored biometric data 222 or derived from values in stored biometric data 222.

For example, a frequency of strumming can be identified for a right hand, a position of the right hand, and other parameters for the right hand can be identified in biometric data 302 to form parameters 232 for prior motion 224. In this illustrative example, frequency can be derived from changes in the position of the right hand over time obtained from biometric data 302. Biometric data 302 can be stored to form stored biometric data 222 for prior motion 224.

In this manner, stored biometric data 222 in parameters 228 in motion action models 244 for prior motion 224 can be compared directly or indirectly to detected biometric data 218 when user 202 is asked to perform new motion 214 to form comparison 234. Comparison 234 can be examined to identify the sequence of motor actions 226 for new motion 214 as compared to predefined sequence 240 of motor actions 230 for prior motion 224 and variance 248 of parameters 228 for motor actions 226 in new motion 214 from parameters 232 for motor actions 230 in prior motion 224.

The illustration of authentication system 200 and the different components in in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, additional verification may be made if a sufficient match is absent between new motion 214 and prior motion 224. The additional verification can be selected from at least one of repeating performance of new motion 214 or performing a second new motion. In yet another illustrative example, authentication of user 202 may also include other biometric data such as a fingerprint, a voiceprint, or other suitable types of biometric data in addition to biometric data obtained from motions made by users.

Figure 4:
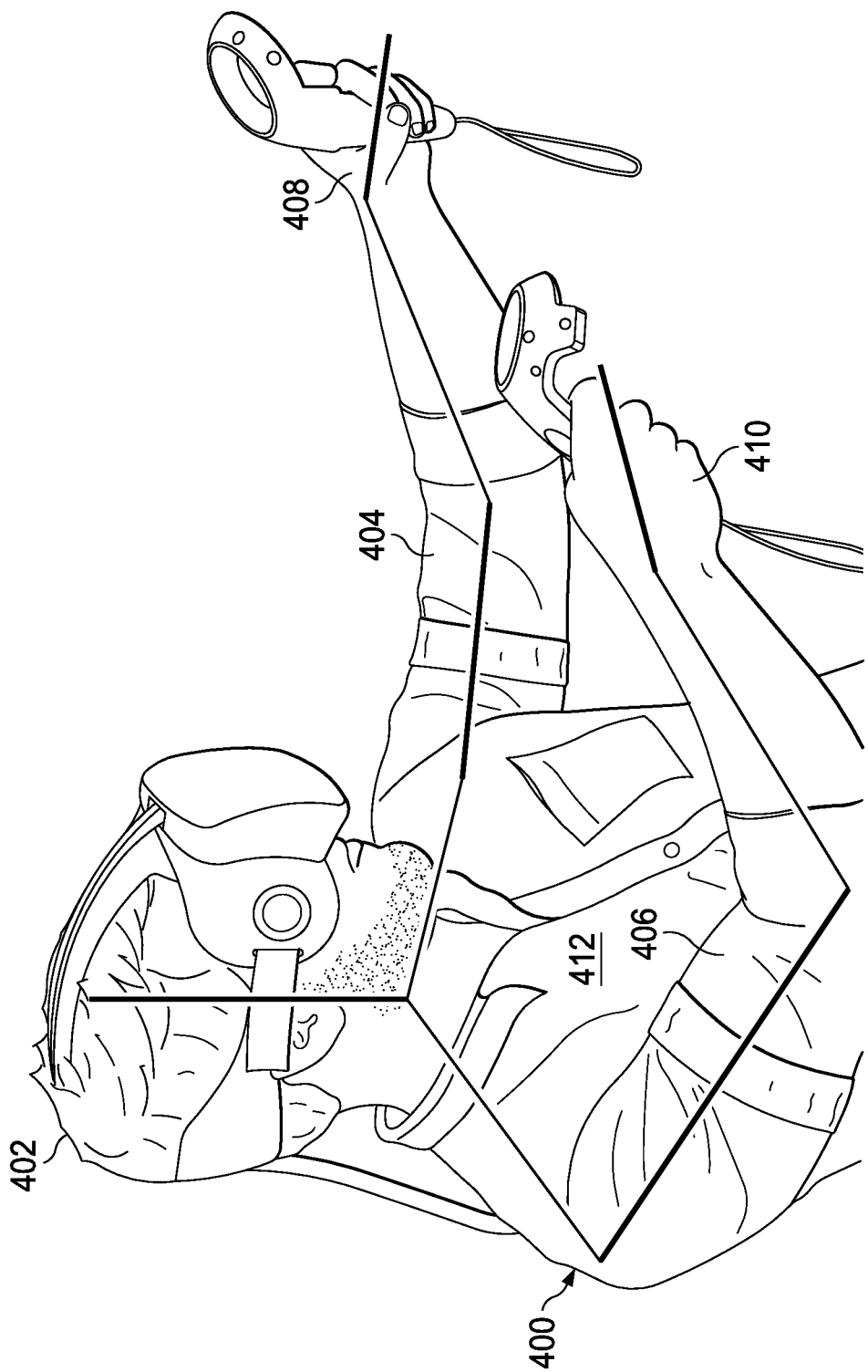
FIG. 4 is an illustration of a user performing an air guitar motion in accordance with an illustrative embodiment.

Turning to FIG. 4, an illustration of a user performing an air guitar motion is depicted in accordance with an illustrative embodiment. In this illustrative example, user 400 performs an air guitar motion in which user 400 moves to play an air guitar as part of the authentication process. The air guitar motion can be an example of new motion 214 or prior motion 224 in FIG. 2. This motion performed by user 400 can be detected by a sensor system and analyzed to determine whether the user is an authenticated user.

This air guitar motion comprises a number of motor actions. As depicted, a motor action is associated with different parts of user 400. In this illustrative example, a motor action is present for head 402, left arm 404, right arm 406, left hand 408, right hand 410, and torso 412.

Each motor action for each part of user 400 can have features associated with performing an air guitar motion. For example, right hand 410 has a position and strumming frequency for the strings of the air guitar. Left hand 408 has a position which includes an angle to the guitar neck held by left hand 408. Further, the motor action for each part and have biometric data such as speed, acceleration, start position, end position, and other parameters. This biometric data can be compared to stored biometric data for the air guitar motion that was made for comparison in determining whether user 400 is an authenticated user for accessing a computer resource.

Figure 5:
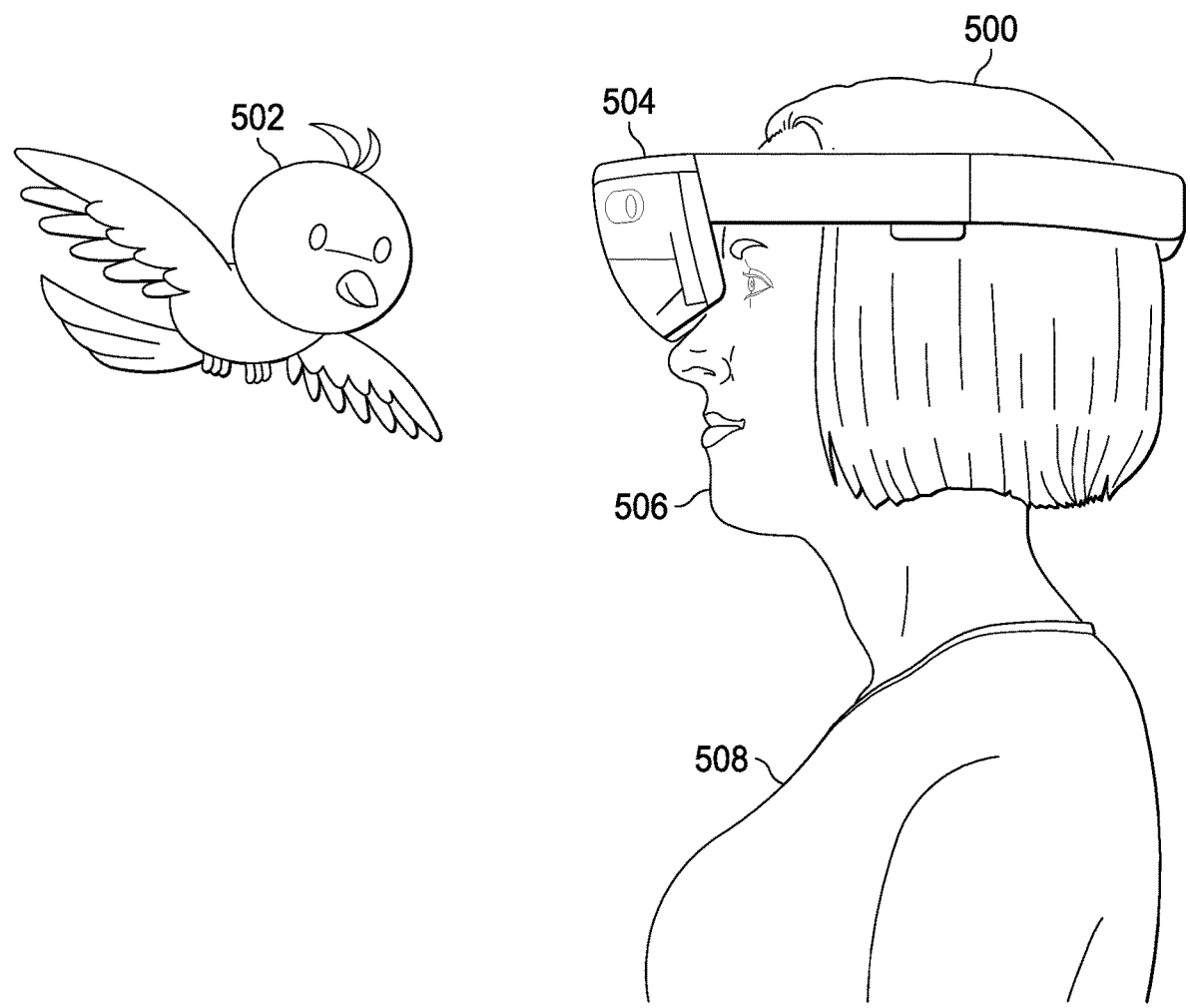
FIG. 5 is an illustration of the user following a virtual object in accordance with an illustrative embodiment.

With reference to FIG. 5, an illustration of the user following a virtual object is depicted in accordance with an illustrative embodiment. In this illustrative example, user 500 performs a follow-an-object motion in which user 500 follows the movement of virtual bird 502 seen by user 500 on virtual reality headset 504. This follow-the-object motion is part of an authentication process and is an example of new motion 214 or prior motion 224 in FIG. 2. The performance of this motion by user 500 can be detected by a sensor system and analyzed to determine whether user 500 is an authorized user.

With this motion of following an object, motor actions such as movement of head 506 and torso 508 can be identified. The biometric data from these motor actions can be compared to stored biometric data to determine whether a sufficient match is present between the motion performed by user 500 and the motion previously performed to determine whether user 500 is an authenticated user that can access a computer resource.

The illustration of motions performed by users in FIG. 4 and FIG. 5 for an authentication of the users are presented for purposes of illustrating only some examples of motions that may be used. These illustrations are not meant to limit the manner in which other illustrative embodiments can be implemented. For example, another motion can be forming a teapot, kicking a ball, swinging a bat, or other motions. As another example, additional interactions can be identified in addition to those shown. For example, in FIG. 4, motor actions can also be identified for individual fingers on at least one of left hand 408 or right hand 410.

Figure 6:
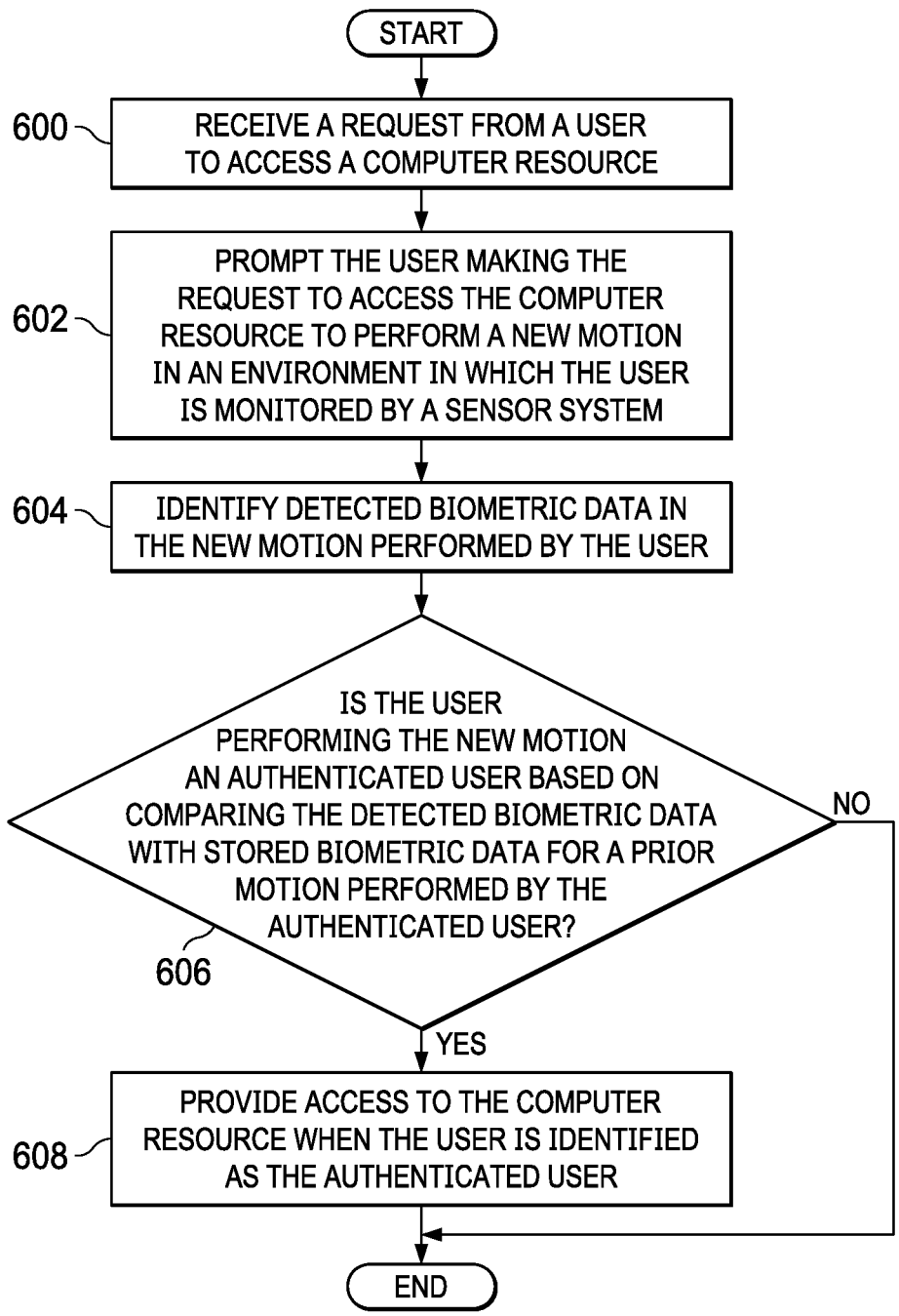
FIG. 6 is a flowchart of a process for authenticating a user in accordance with an illustrative embodiment.

Turning next to FIG. 6, a flowchart of a process for authenticating a user is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, the process can be implemented in motion analyzer 212 running on computer system 210 in FIG. 1.

The process beings by receiving a request from a user to access a computer resource (step 600). The process prompts the user making the request to access the computer resource to perform a new motion in an environment in which the user is monitored by a sensor system (step 602). In step 602, the prompt may specify the motion that is to be formed by the user. In another example, the prompt may only request that the user perform a motion without identifying what motion is to be performed.

The process identifies detected biometric data in the new motion performed by the user (step 604). The detected biometric data can be received from a sensor system that monitors the user performing the new motion. A determination is made as to whether the user performing the new motion is an authenticated user based on comparing the detected biometric data with stored biometric data for a prior motion performed by the authenticated user (step 606).

If the user is the authenticated user, the process provides access to the computer resource when the user is identified as the authenticated user (step 608). The process terminates thereafter. With reference again to step 606, if the user is not identified as the authenticated user, the process terminates without providing access to the computer resource.

Figure 7:
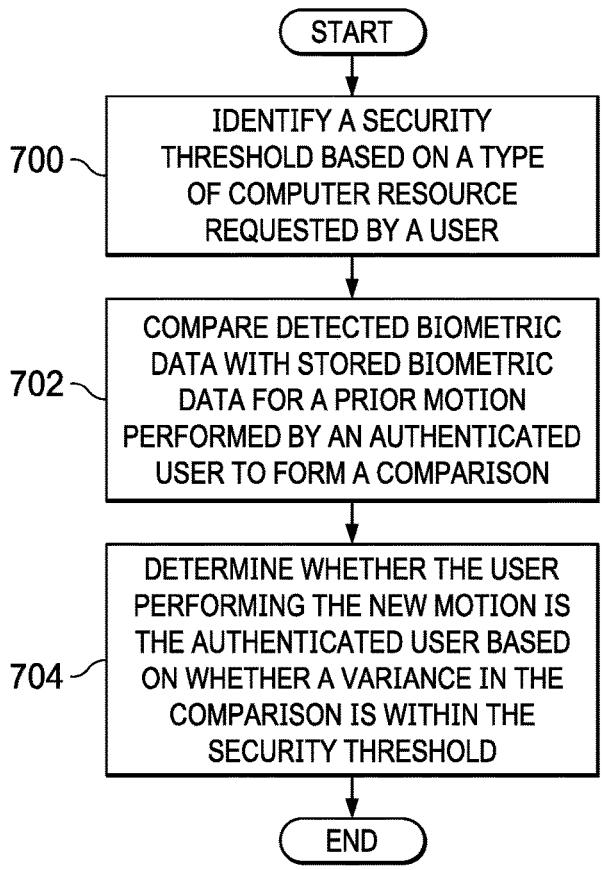
FIG. 7 is a flowchart of a process for determining whether a user is an authenticated user in accordance with an illustrative embodiment.

With reference next to FIG. 7, a flowchart of a process for determining whether a user is an authenticated user is depicted in accordance with an illustrative embodiment. The process illustrated in FIG. 7 is an example of one manner in which step 606 in FIG. 6 can be implemented.

The process begins by identifying a security threshold based on a type of computer resource requested by a user (step 700). In step 700, the security threshold is a value that identifies how much variation between detected biometric data for a new motion and stored biometric data for a prior motion is present for a sufficient match to occur in identifying the user as the authenticated user. As the security threshold increases, the amount of variation allowed increases. For example, accessing a computer resource in the form of a camera may have a higher security threshold than accessing a computer resource in the form of personally identifiable information.

The process compares detected biometric data with stored biometric data for a prior motion performed by an authenticated user to form a comparison (step 702). As depicted, step 702 can be performed by identifying parameters for motor actions from the detected biometric data for the new motion and comparing those parameters to parameters in motion action models for the prior motion.

The process determines whether the user performing the new motion is the authenticated user based on whether a variance in the comparison is within the security threshold (step 704). The process terminates thereafter.

Figure 8:
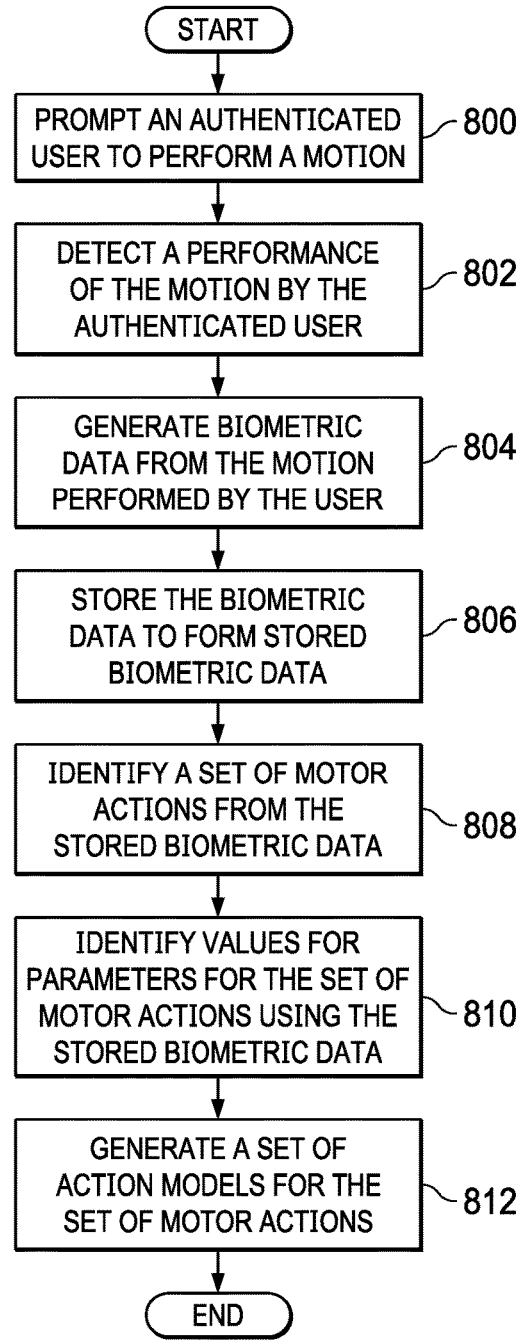
FIG. 8 is a flowchart of a process for generating stored biometric data in accordance with an illustrative embodiment.

With reference next to FIG. 8, a flowchart of a process for generating stored biometric data is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in motion analyzer 212 running on computer system 210 in FIG. 2. This process can be used to process detected motion such as new motion 214 and prior motion 224 in FIG. 2.

The process begins by prompting an authenticated user to perform a motion (step 800). The authenticated user is a user performing a motion that is used to create biometric data for comparison at a later time when an authentication process is performed. In step 800, the process may prompt the authenticated user to perform a specific motion. In another example, the prompt may only prompt a user to perform a motion without identifying the motion, thus leaving the authenticated user to select what motion is to be performed.

The process detects a performance of the motion by the authenticated user (step 802). This motion is an example of prior motion 224 in FIG. 2. The process generates biometric data from the motion performed by the user (step 804). The process stores the biometric data to form stored biometric data (step 806). In step 806, the stored biometric data is an example of stored biometric data 222 in FIG. 2.

The process then identifies a set of motor actions from the stored biometric data (step 808). These different motor actions can be defined through at least one of user input, an analysis of stored biometric data by an artificial intelligence system, an analysis of the stored biometric data by an expert system, or using some other suitable type of process that is capable of segmenting or dividing the prior motion into individual motion actions. The process then identifies values for parameters for the set of motor actions using the stored biometric data (step 810). The process then generates a set of action models for the set of motor actions (step 812). The process terminates thereafter.

Figure 9:
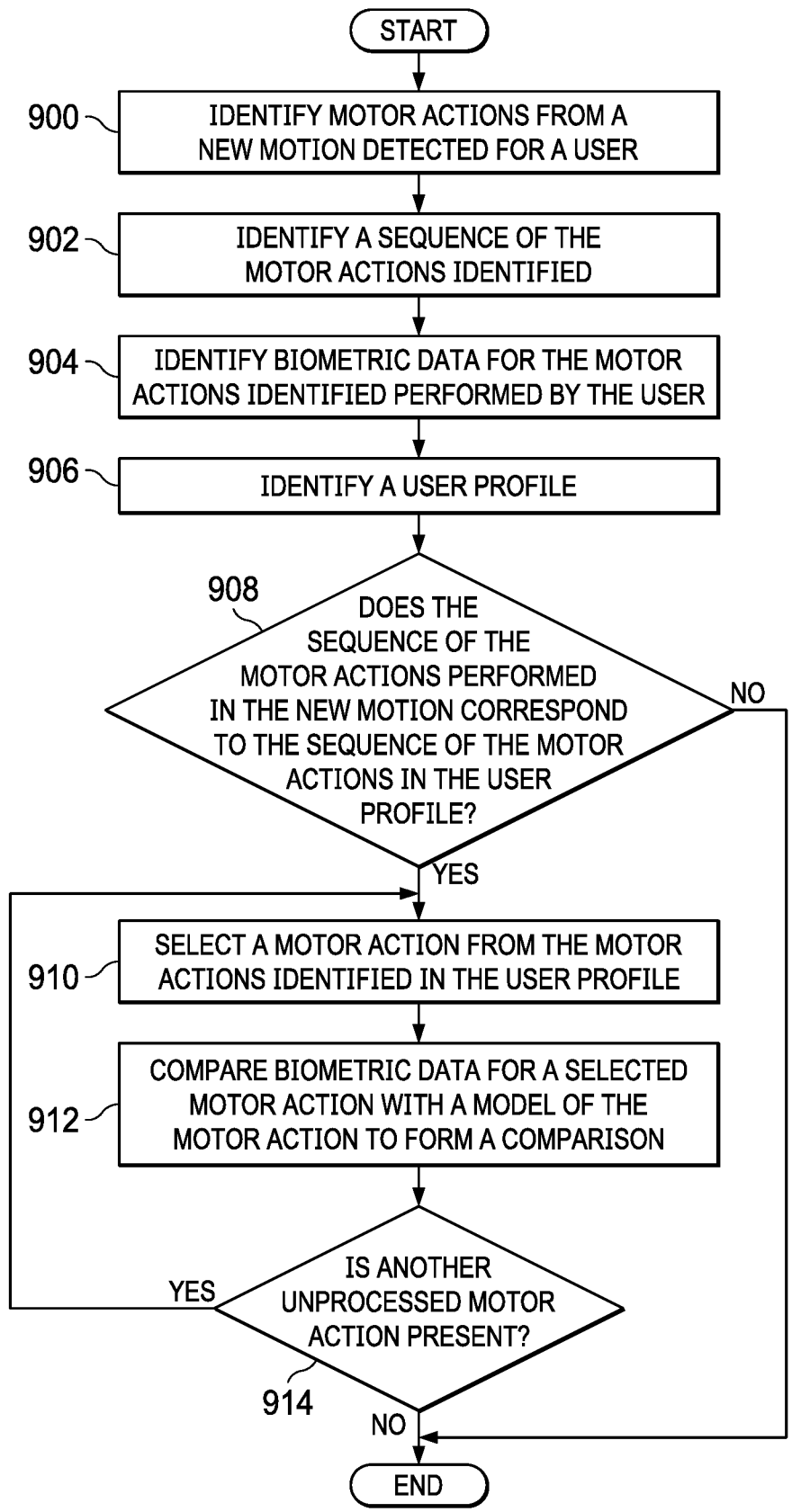
FIG. 9 is a flowchart of process for processing a detected motion in accordance with an illustrative embodiment.

With reference next to FIG. 9, a flowchart of a process for processing a detected motion is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in motion analyzer 212 running on computer system 210 in FIG. 2. This process can be used to process detected motion such as new motion 214 and prior motion 224 in FIG. 2.

The process begins by identifying motor actions from a new motion detected for a user (step 900). The identification of motor actions may be performed any number of different ways. For example, the motor actions in the new motion can be compared to motion models of motor actions expected. If the new motion is posing as a teapot, the process can identify the movement for each part of the user, such as a left arm, a right arm, a head, and a torso. The movement of each of these parts of the user is a motor action. This analysis can be performed using an artificial intelligence system or other suitable process.

The process identifies a sequence of the motor actions identified (step 902). The motor actions can be performed in particular order. In some cases, some motor actions simultaneously overlap each other. The process identifies biometric data for the motor actions identified performed by the user (step 904).

The process identifies a user profile (step 906). The user profile identifies one or more prior motions. For example, the user profile can identify a prior motion of posing as a teapot. The prior motion in the user profile includes models for the different motor actions. These models are for motor actions that may be used to analyze the motor actions for the new motion.

The process determines whether the sequence of the motor actions performed in the new motion correspond to the sequence of the motor actions in the user profile (step 908). If the sequence corresponds, the process selects a motor action from the motor actions identified in the user profile (step 910). The process compares biometric data for a selected motor action with a model of the motor action to form a comparison (step 912).

The process determines whether another unprocessed motor action is present (step 914). If another unprocessed motor action is present, the process returns to step 910. Otherwise, the process terminates. With reference again to step 908, if the sequence of the motor actions performed in the new motion do not correspond to the sequence of the motor actions in the user profile, the process terminates. In this instance, the comparison of the motor actions is unnecessary when the sequence does not match. In another illustrative example, the comparison of the motor actions can be made even when the sequence is not correct for the new motion performed by the user.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in step 606 in FIG. 6, if the user is not identified as the authenticated user, the process can optionally prompt the user to perform a second new motion when the detected biometric data for the new motion does not sufficiently match the stored biometric data for the prior motion. The process can then identify second detect biometric data in the second new motion performed by the user and determine whether the user performing the second new motion is the authenticated user based on comparing the second detected biometric data with stored biometric data for a prior motion performed by the authenticated user.

Figure 10:
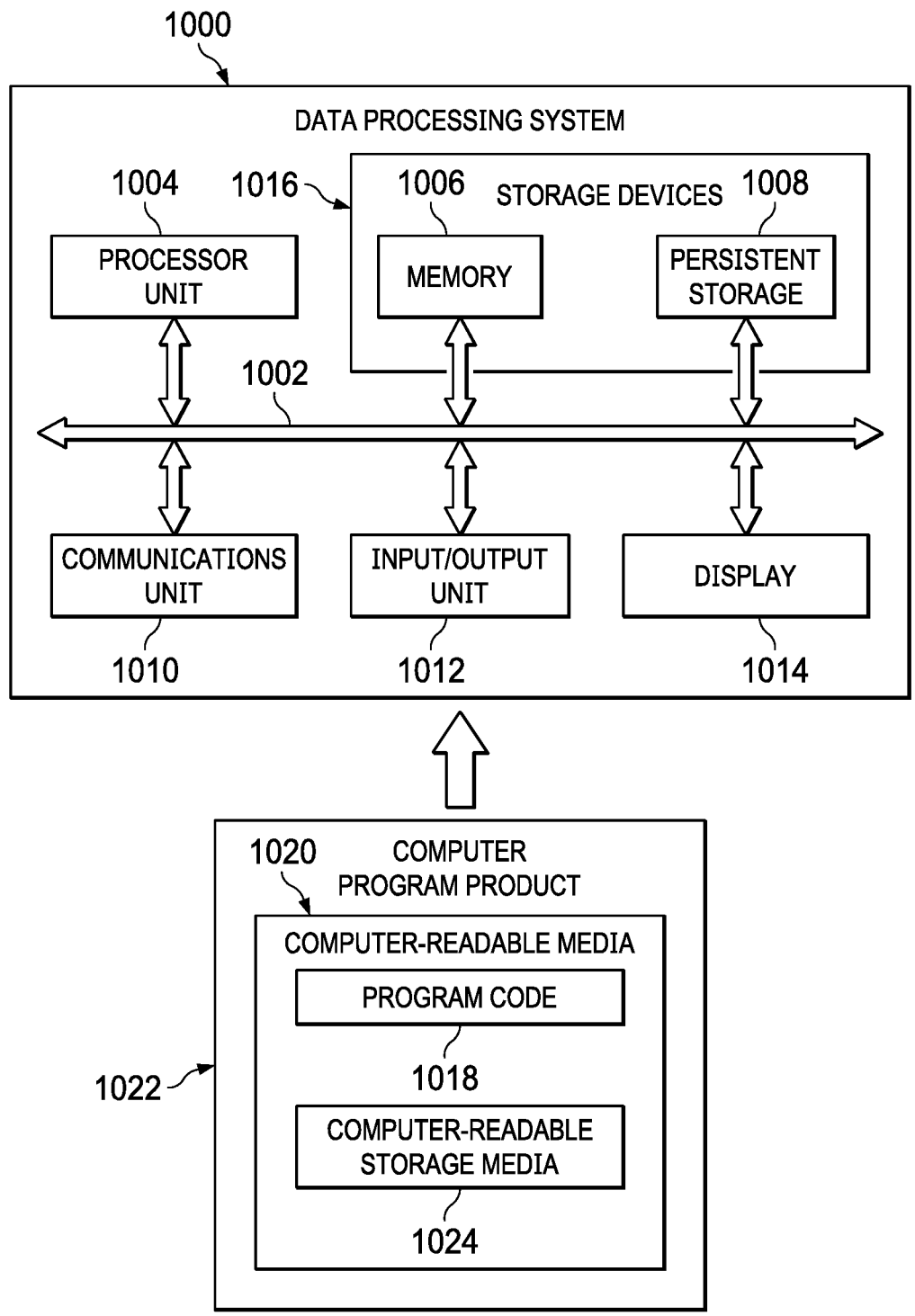
FIG. 10 is a block diagram of a data processing system in accordance with an illustrative embodiment.

Turning now to FIG. 10, a block diagram of a data processing system is depicted in accordance with an illustrative embodiment. Data processing system 1000 may be used to implement server computer 104, server computer 106, client devices 110, device 204, and computer system 210 in FIGS. 1-2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a solid-state drive (SSD), a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer-readable program code that may be read and run by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 may be transferred to data processing system 1000 using a computer-readable signal media. The computer-readable signal media may be, for example, a propagated data signal containing program code 1018. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Thus, the illustrative embodiments of the present invention provide a computer-implemented method, a computer system, and a computer program product for determining whether a user is an authenticated user from a motion performed by the user. For example, users can be prompted to perform specific motions. For example, the user may be directed to move into a pose to form a teapot, catch a virtual ball, eat a virtual taco, or perform other motions for user authentication. A sensor system detects the motions and identifies biometric data. This biometric data may include, for example, movement of different parts of the user, position of various parts of the user, and the speed, precision, and variability in the motions. This biometric data can be stored and compared with a later performance of the same motions to authenticate the user.

Thus, one or more technical solutions in the illustrative examples are present that overcome a technical problem with authenticating a user to access computer resources in a virtual reality or an augmented reality environment. One or more illustrative examples enable a user to perform authentication to access a computer resource without using a keyboard or mouse. Instead, the user performs a motion that is compared to a profile for a user that is authorized to access the computer resource. The profile includes biometric data from performing a prior motion. The biometric data detected by the user is compared to the stored biometric data. This comparison can be performed by comparing the detected biometric data with parameters in motion action models based on the stored biometric data. As a result, one or more technical solutions may provide a technical effect of enabling a user to identify itself as an authenticated user to access a computer resource by performing a motion.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for authenticating a user, the method comprising:

responsive to a request for access to a computer resource, prompting, by a computer system, the user making the request to access the computer resource to perform a new motion in an environment in which the user making the request is monitored by a sensor system, wherein the new motion is a specific motion that the user making the request is prompted to perform and is based on a type of the computer resource requested by the user;

identifying, by the computer system, detected biometric data in the new motion performed by the user performing the new motion;

determining, by the computer system, whether the user performing the new motion is an authenticated user based on comparing the detected biometric data with stored motion action models for a prior motion performed by the authenticated user and stored biometric data for the prior motion performed by the authenticated user, wherein the motion action models include the stored biometric data, motor actions, and acceptable variations from motions described by the stored biometric data; and providing, by the computer system, access to the computer resource when the user is identified as the authenticated user.

2. The method of claim 1, wherein the determining step comprises:

comparing the detected biometric data for motor actions in the new motion with motion action models for the prior motion to form a comparison, wherein the motion action models are generated for a plurality of motor actions by identifying the plurality of motor actions from the stored biometric data and identifying values for parameters for the plurality of motor actions using the stored biometric data; and determining whether the user performing the new motion is the authenticated user based on the comparison.

3. The method of claim 1 further comprising:

identifying, by the computer system, the stored biometric data from the authenticated user performing the prior motion at a time prior to the new motion being performed.

4. The method of claim 1, wherein the prior motion comprises a plurality of gestures, wherein the stored biometric data comprises movement data identified for each of the plurality of gestures, and wherein the environment is selected from a group comprising an augmented reality environment, a virtual reality environment, and a mixed reality environment, and further comprising:
receiving, by the computer system, the detected biometric data from the environment.

5. The method of claim 4 further comprising:
prompting the user to perform the plurality of gestures forming the prior motion.

6. The method of claim 1 further comprising:
prompting, by the computer system, the user to perform a second new motion when the detected biometric data for the new motion does not sufficiently match the stored biometric data for the prior motion, wherein the second new motion is different than the new motion;
identifying, by the computer system, second detected biometric data in the second new motion performed by the user; and
determining, by the computer system, whether the user performing the second new motion is the authenticated user based on comparing the second detected biometric data with the stored biometric data for the prior motion performed by the authenticated user.

7. The method of claim 1, wherein the determining step comprises:
identifying, by the computer system, a security threshold maintained in the motion action models based on a type of the computer resource requested by the user;
comparing, by the computer system, the detected biometric data with the stored biometric data for the prior motion performed by the authenticated user to form a comparison; and
determining, by the computer system, whether the user performing the new motion is the authenticated user based on whether the comparison is within the security threshold, wherein the security threshold maintained in the motion action models indicates an amount of variance that can be present between the detected biometric data and the stored biometric data when performing the comparing of the detected biometric data with the stored biometric data.

8. The method of claim 1 further comprising:
selecting, by the computer system, the new motion based on a type of the computer resource requested by the user.

9. The method of claim 4, wherein the new motion that the user making the request to access the computer resource is prompted to perform is the user following a moving virtual object seen by the user on a virtual reality headset.

10. An authentication system comprising:
a computer system; and
a motion analyzer running on the computer system, wherein the motion analyzer prompts a user making a request to access a computer resource to perform a new motion in an environment in which the user making the request is monitored by a sensor system in response to the request for access to the computer resource, wherein the new motion is a specific motion that the user making the request is prompted to perform and is based on a type of the computer resource requested by the user; identifies detected biometric data in the new motion performed by the user performing the new motion; determines whether the user performing the new motion is an authenticated user based on comparing the detected biometric data with stored motion action models for a prior motion performed by the authenticated user and stored biometric data for the prior motion performed by the authenticated user, wherein the motion action models include the stored biometric data, motor actions, and acceptable variations from motions described by the stored biometric data; and provides access to the computer resource when the user is identified as the authenticated user.

11. The authentication system of claim 10, wherein in determining whether the user performing the new motion is the authenticated user, the motion analyzer compares the detected biometric data for motor actions in the new motion with motion action models for the prior motion to form a comparison, wherein the motion action models are generated for a plurality of motor actions by identifying the plurality of motor actions from the stored biometric data and identifying values for parameters for the plurality of motor actions using the stored biometric data; and determines whether the user performing the new motion is the authenticated user based on the comparison.

12. The authentication system of claim 10, wherein the motion analyzer identifies the stored biometric data from the authenticated user performing the prior motion at a time prior to the new motion being performed, and further comprising:
selecting, by the computer system, the new motion based on a type of the computer resource requested by the user.

13. The authentication system of claim 10, wherein the prior motion comprises a plurality of gestures, wherein the stored biometric data comprises movement data identified for each of the plurality of gestures, wherein the environment is selected from a group comprising an augmented reality environment, a virtual reality environment, and a mixed reality environment, wherein the computer system receives the detected biometric data from the environment, and wherein the new motion that the user making the request to access the computer resource is prompted to perform is the user following a moving virtual object seen by the user on a virtual reality headset.

14. The authentication system of claim 13, wherein the motion analyzer prompts the user to perform the plurality of gestures forming the prior motion.

15. The authentication system of claim 10, wherein the motion analyzer prompts the user to perform a second new motion when the detected biometric data for the new motion does not sufficiently match the stored biometric data for the prior motion, wherein the second new motion is different than the new motion; identifies second detected biometric data in the second new motion performed by the user; and determines whether the user performing the second new motion is the authenticated user based on comparing the second detected biometric data with the stored biometric data for the prior motion performed by the authenticated user.

16. The authentication system of claim 10, wherein in determining whether the user performing the new motion is an authenticated user, the motion analyzer identifies a security threshold maintained in the motion action models based on a type of the computer resource requested by the user; compares the detected biometric data with the stored biometric data for the prior motion performed by the authenticated user to form a comparison; and determines whether the user performing the new motion is the authenticated user based on whether the comparison is within the security threshold, wherein the security threshold maintained in the motion action models indicates an amount of variance that can be present between the detected biometric data and the stored biometric data when performing the comparing of the detected biometric data with the stored biometric data.

17. A computer program product for authenticating a user, the computer program product comprising:
a computer-readable storage media;
first program code, stored on the computer-readable storage media, responsive to a request for access to a computer resource, for prompting the user making the request to access the computer resource to perform a new motion in an environment in which the user making the request is monitored by a sensor system, wherein the new motion is a specific motion that the user making the request is prompted to perform and is based on a type of the computer resource requested by the user;
second program code, stored on the computer-readable storage media, for identifying detected biometric data in the new motion performed by the user performing the new motion;
third program code, stored on the computer-readable storage media, for determining whether the user performing the new motion is an authenticated user based on comparing the detected biometric data with stored motion action models for a prior motion performed by the authenticated user and stored biometric data for the prior motion performed by the authenticated user, wherein the motion action models include the stored biometric data, motor actions, and acceptable variations from motions described by the stored biometric data; and
fourth program code, stored on the computer-readable storage media, for providing the access to the computer resource when the user is identified as the authenticated user.

18. The computer program product of claim 17 further comprising:
fifth program code, stored on the computer-readable storage media for identifying the stored biometric data from the authenticated user performing the prior motion at a time prior to the new motion being performed; and
sixth program code, stored on the computer-readable storage media, for selecting the new motion based on a type of the computer resource requested by the user.

* * * * *